US006380307B1

(12) United States Patent
Brennan et al.

(10) Patent No.: US 6,380,307 B1
(45) Date of Patent: Apr. 30, 2002

(54) SILANE FUNCTIONALIZED POLYAROMATIC POLYMERS AND METHODS FOR THEIR PRODUCTION

(75) Inventors: Anthony B. Brennan, Gainesville, FL (US); Rodrigo L. Orefice, Belo Horizonte MG (BR); Michael P. Zamora, Baton Rouge, LA (US)

(73) Assignee: University of Flordia Research Foundation, Inc., Gainesville, FL (US)

( * ) Notice: Subject to any disclaimer, the term of this patent is extended or adjusted under 35 U.S.C. 154(b) by 0 days.

(21) Appl. No.: 09/529,924

(22) PCT Filed: Oct. 23, 1998

(86) PCT No.: PCT/US98/22366

§ 371 Date: Jul. 6, 2000

§ 102(e) Date: Jul. 6, 2000

(87) PCT Pub. No.: WO99/20679

PCT Pub. Date: Apr. 29, 1999

Related U.S. Application Data

(60) Provisional application No. 60/062,700, filed on Oct. 23, 1997.

(51) Int. Cl.$^7$ ................................................ C08L 83/00
(52) U.S. Cl. ................ 525/102; 525/106; 525/431; 525/535; 525/446; 525/471; 525/534; 525/906; 528/25; 528/26; 528/38; 528/27; 528/29

(58) Field of Search ............................. 528/26, 27, 25, 528/38, 29; 525/431, 435, 446, 102, 106, 471, 534, 906

(56) References Cited

U.S. PATENT DOCUMENTS

| 4,499,149 A | | 2/1985 | Berger ...................... 428/447 |
| 5,177,156 A | * | 1/1993 | Aritomi et al. .............. 525/393 |
| 5,332,801 A | * | 7/1994 | Tsukahara et al. .......... 525/397 |
| 5,747,626 A | | 5/1998 | Krepski et al. ............... 528/28 |
| 6,100,367 A | * | 8/2000 | Kobayashi et al. ......... 528/196 |

OTHER PUBLICATIONS

JP 5163344, abstract. Jun. 1993.*
Choi et al. "Synthesis and Characterization of Aromatic Polymers Containing Pendant Silyl Groups. I. Polyarylates" Journal of Polymer Science Part A: Polymer Chemistry, vol. 30, 1575–1581, 1982.*

* cited by examiner

*Primary Examiner*—Margaret G. Moore
(74) *Attorney, Agent, or Firm*—Saliwanchik, Lloyd & Saliwanchik

(57) ABSTRACT

Silane functionalized polyaromatic polymers which may be prepared by reacting a polyaromatic polymer with a sulfonating agent and reacting the sulfonated polyaromatic polymer with a silane terminated coupling agent.

26 Claims, 3 Drawing Sheets

SILANE FUNCTIONALIZED POLYAROMATIC POLYMERS AND METHODS FOR THEIR PRODUCTION

This application is a 371 of PCT/US98/22366 filed Oct. 23, 1998 which claims benefit of Provisional No. 60/062,700 filed Oct. 23, 1997.

Research leading to the completion and reduction to practice of the invention was supported in part by AFOSR Grant No. F4Q620-95-1-0382 issued by the Department of the Air Force. The United States Government has certain rights in and to the invention claimed herein.

BACKGROUND OF THE INVENTION

1. Field of the Invention

The present invention relates to novel methods for the functionalization of polyaromatic polymers to modify the chemical and mechanical properties thereof and the resultant polyaromatic polymer derivatives.

2. Description of the Prior Art

Synthetic polymers and engineering plastics have found widespread use in the manufacturing industry for their excellent processability and bulk physical properties. Most such polymers have excellent physical properties such as thermal and long-term stability, resistance to radiation, wear, abrasion, chemical -solvents and low toxicity. These polymers exhibit good mechanical strength.

Most of the engineering polymers also exhibit undesirable properties at the polymer surface or interface. Thus, the surfaces of articles constructed of most of the synthetic engineering plastics are hydrophobic, non-wettable and of low biocompatibility. The polymer art has, therefore, sought ways of modifying the surface properties and characteristics of these materials to suit their anticipated application.

An early method [Gregor et al, *J. Applied Polymer Sci.*, Vol. 30, pages 1113–1132 (1985); and U.S. Pat. No. 4,705,753] for modifying or derivatizing polymer surfaces involved the introduction of a comonomer bearing desirable functional groups to the monomer precursor of the primary hydrophobic engineering polymer. This method necessarily results, however, in a copolymer whose backbone is substantially different from the homopolymer and frequently provides a material with less than optimum performance characteristics.

A more fundamental approach involves the use of a physical blend of polymers, one of which is the so-called "functional" polymer whose desirable properties and pendant functional groups will be evident at the bulk polymer interface or, in the case where the polymer has been made into an is article of manufacture, at that article's surface. This technique, besides invariably producing a different material, performance-wise also suffers from limitations involving the physical compatibility of the two types of polymers. Few pairs of polymers are sufficiently compatible to be blended successfully. In this respect, even the molecular weight distribution of one of the components may play a critical role. Even after a suitable pair has been found, the distribution of the functional polymer component over the polymer surface is hard to predict or control. Moreover, such blends are susceptible to phase separation resulting in the removal of the functional component over the course of ordinary use. A number of issued patents describe these blending techniques. See, e.g., U.S. Pat. Nos. 3,629,170; 3,781,381 and 4,387,187. A variation involving an additional cross-linking step is discussed in U.S. Pat. No. 4,596,858 and in Gryte et al, *J. Applied Polymer Sci.*, Vol. 23, pages 2611–2625 (1979).

Another method proposes the grafting of a second polymer onto the surface of the manufactured article. This method requires polymerizing the monomer precursor of the second polymer and then irradiating the engineering polymer surface with gamma, electron beam or ultraviolet radiation. British Patent No. 801,479, for instance, describes a method in which a coating material is applied onto a structural surface which is then exposed to charged particle radiation to initiate bonding between the two materials. A variation of this process is set forth in United Kingdom Patent No. 839,483 in which the bulk polymer is first subjected to ionizing radiation to activate the structural surface and then treated with a dissimilar organic coating material. Such radiation treatment can penetrate the materials to a significant depth and could be detrimental to their structural integrity. High energy radiation can also precipitate polymer degradation and chain scission.

Yet another alternative is the "composite" or multi-layer approach. The strategy behind this technique is to preserve the bulk properties of the article of manufacture and its primary polymer component while introducing the desired interfacial or surface characteristics via a filler. In practice, the composite approach, although potentially the most attractive, is characterized by a tenuous, weak link at the surface of the bulk polymer and the modifying agent. This instability is particularly apparent where the two materials are simply held together by adsorptive forces.

Polyaromatic polymers have found widespread commercial applications, particularly in the area of composites, i.e., polymer matrices reinforced with a variety of inorganic fillers.

Polyarylcarbonates, for example, are increasingly being used as engineering or structural polymers. The highly hydrophobic polycarbonates, however, tend to phase separate when attempts are made to reinforce them with hydrophilic inorganic fillers such as silica due to their mutual incompatibility. Polyarylsulfone composites are finding increasing use in biomedical and other structural applications. The tendency of polyarylsulfones to degrade under in vitro and in vivo conditions, however, have limited their utility in the past. Proposals to enhance their applicability in the biomedical field by reinforcement of polyarylsulfone materials with inorganic fillers have met with limited success due to the lack of high strength interfacial bonding between the incompatible hydrophobic polyarylsulfone surfaces and the largely hydrophilic surfaces of the inorganic reinforcing fillers.

Thus, there remains a need for the covalent derivatization or modification of hydrophobic polymer surfaces, especially the surfaces of articles manufactured therefrom, under relatively mild reaction conditions. Further, it would be most advantageous if such a modification could be performed under heterogeneous conditions in which the hydrophobic polymer material is first manufactured and processed to exploit its desirable engineering properties and then exposed to a treatment which seeks to modify the surface properties of the preformed article without altering its gross structural characteristics. Most importantly, the modification must be applicable to hydrophobic polymers such as the polyarylsulfones, etc., which tend to be inert and unreactive.

It is an object of the present invention to overcome the disadvantages associated with the prior art in providing functionalized polyaromatic resins and polymers.

SUMMARY OF THE INVENTION

The above and other objects are realized by the present invention, one embodiment of which relates to a method of preparing a silane functionalized polyaromatic polymer comprising:

(a) reacting a polyaromatic polymer with a sulfonating agent to introduce sulfonic acid groups on repeat aromatic rings in the polyaromatic polymer, and (b) reacting the product of (a) with a silane terminated coupling agent capable of undergoing a condensation reaction with the sulfonic acid groups thereof to produce a polyaromatic polymer having silane terminated groups on the repeat aromatic rings thereof; the reactions (a) and (b) being conducted under conditions which do not substantially destabilize the polyaromatic polymer.

Another embodiment of the invention is the silane functionalized polyaromatic polymer produced by the above-described method.

An additional embodiment of the invention comprises a silane functionalized polyaromatic polymer having the formula:

[Ar]—A—Si(H)$_x$(OR)$_{3-x}$ wherein:

Ar is a repeat aromatic ring in the polyaromatic polymer;

A is a non-reactive bridging group between Ar and Si;

R is, e.g., an alkyl group; and x is an integer.

DETAILED DESCRIPTION OF THE INVENTION

Figure 1:
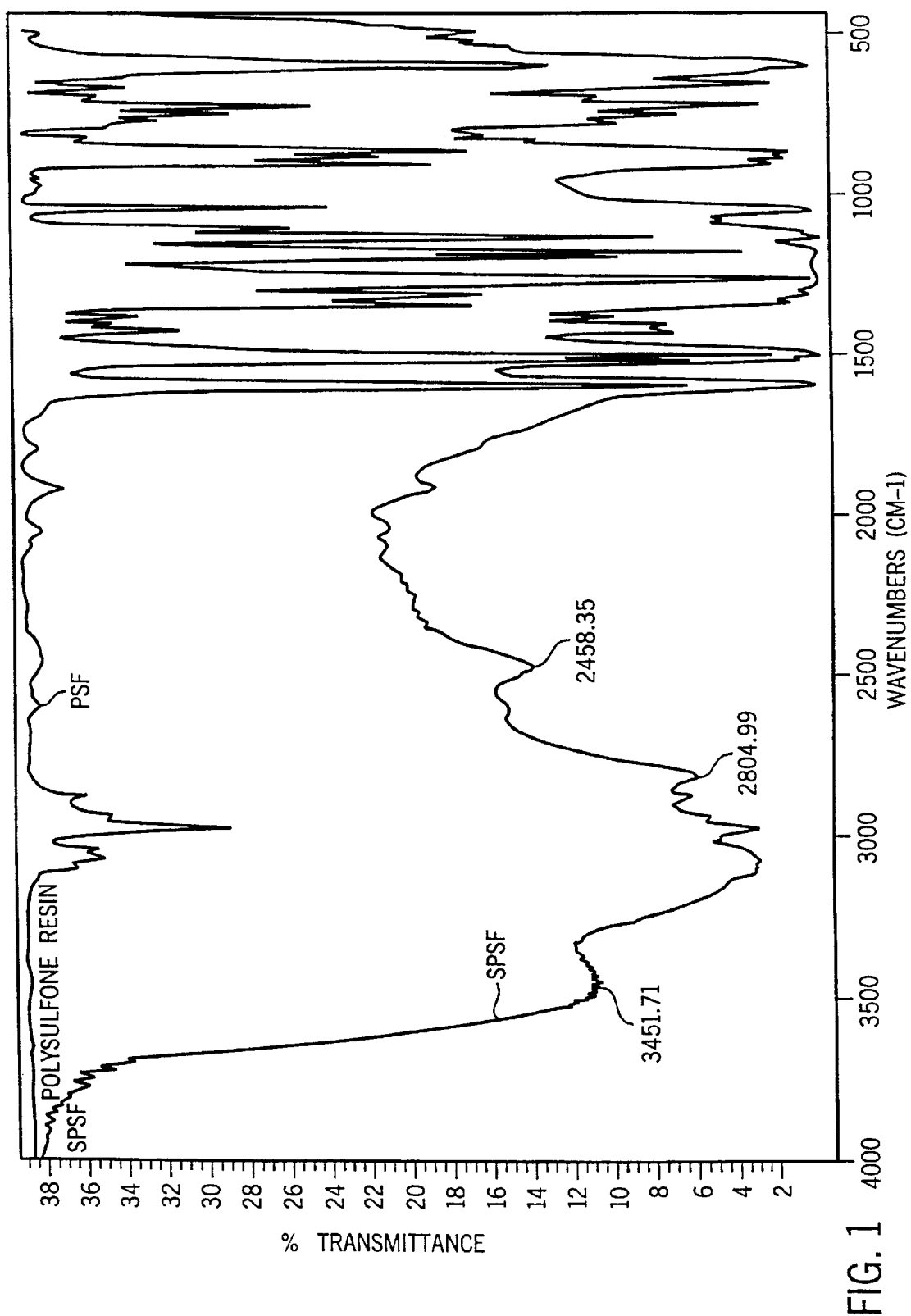
FIGS. 1–3 are graphic representations of various mechanical properties of various polymers disclosed and/or claimed herein.

The present invention is predicated on the discovery that novel silane functionalized polymers can be prepared by introducing sulfonic acid groups into the aromatic rings of polyaromatic polymers, followed by reacting the sulfonic acid groups with silane terminated coupling agents.

Any polyaryl polymer containing aromatic rings in the backbone thereof into which reactive sulfonic acid groups can be introduced by reaction with sulfonating agents under conditions which do not destabilize the polymer may be functionalized according to the invention. Exemplary of such polymers are polyarylsulfones, polyarylcarbonates, polyarylethersulfones, polyaryloxides, polyarylethers, polyaryl-alkenes, polyaryletherketones, polyarylimides, copolymers and/or mixtures thereof. The invention will be illustrated herein employing a polyarylsulfone, specifically polyphenylenesulfone; it being understood that the principles of the invention as described herein are equally applicable to the other polyaryl polymers described above.

The polyaryl polymers may be functionalized first by reaction with any sulfonating agent capable of introducing reactive sulfonic acid or sulfonyl groups into the aromatic rings thereof. Exemplary of such agents are chlorosulfonic acid and the like. Sulfonation may be achieved under conditions which do not destabilize the polymer, but which drive the reaction to completion in a reasonably efficient manner. Generally, the polymer is dissolved in a suitable solvent such as, e.g., dichloroethane, and reacted with the sulfonating agent at a suitable temperature. Generally, the molar ratio of sulfonating agent to polyaromatic polymer is from about 1:1 to about 180:1; preferably, from about 45:1 to about 125:1.

The degree of sulfonation is, of course, dependent upon the molar ratio of sulfonating agent to polymer, it being understood that the particular ratio employed is dependent upon the degree of sulfonation required for a particular application.

The sulfonated polymers are then reacted with a silane terminated coupling agent under condensation reaction conditions to form the silane functionalized polymers. Suitable silane terminated coupling agents are those having the formula:

Q—A—Si (H)$_x$ (OR)$_{3-x}$ wherein:

Q is a functional group capable of reacting with the sulfonic acid groups of the sulfonated polymer;

A is a non-reactive bridging group between Q and Si;

R is an alkyl or alkenyl group, preferably having from 1 to 4 carbon atoms; and x is an integer from 0 to 2.

Preferred among the coupling agents of the above formula are those wherein Q is

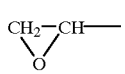

or NH$_2$—; A is alkylene having up to about 200 carbon atoms; arylene, including such groups interrupted by an O atom, having a molar mass from about 14 to about 10,000 g; and x is 0; e.g.,

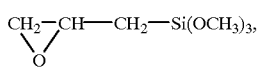

H$_2$N—(CH$_2$)$_3$—Si(OCH$_3$)$_3$ and H$_2$N—C$_6$H$_5$—Si(OCH$_3$)$_3$. It will be understood by those skilled in the art, however, that any reactive silane terminated coupling agent capable of undergoing a condensation reaction with the reactive sulfonic acid groups of the sulfonated polymer to produce a polyaryl polymer having silane terminated groups in the aromatic rings thereof may be utilized in the practice of the invention herein.

The invention is illustrated by the following non-limiting examples.

EXAMPLE 1

The sulfonation of polyphenylenesulfone was performed by dissolving a commercially available polymer (Udel® by Amoco) in dichloroethane (10% wt.). Chlorosulfonic acid was added to the solution at room temperature for 30 minutes (molar ratio between chlorosulfonic acid/polysulfonate repeat unit=1) to introduce sulfonic acid groups on the polysulfone.

Thermogravimetric (TG) and Differential Thermal Analysis (DTA) was performed in the modified polymers using a Seiko apparatus. The heating rate chosen was 10°/minute in nitrogen flow of 100 ml/minute. The samples were introduced in a platinum crucible and alumina was used as the reference material. Prior to the analysis, the reference material and crucibles were heated until 1,000° C. to eliminate any adsorbed species. Temperature range of analysis was 30° C. to 950° C. The temperature of degradation and drop in weight are to be compared among the modified polymers and the unmodified one. The drop in weight during a degradation step can be used to provide information about the degree of substitution.

Figure 2:
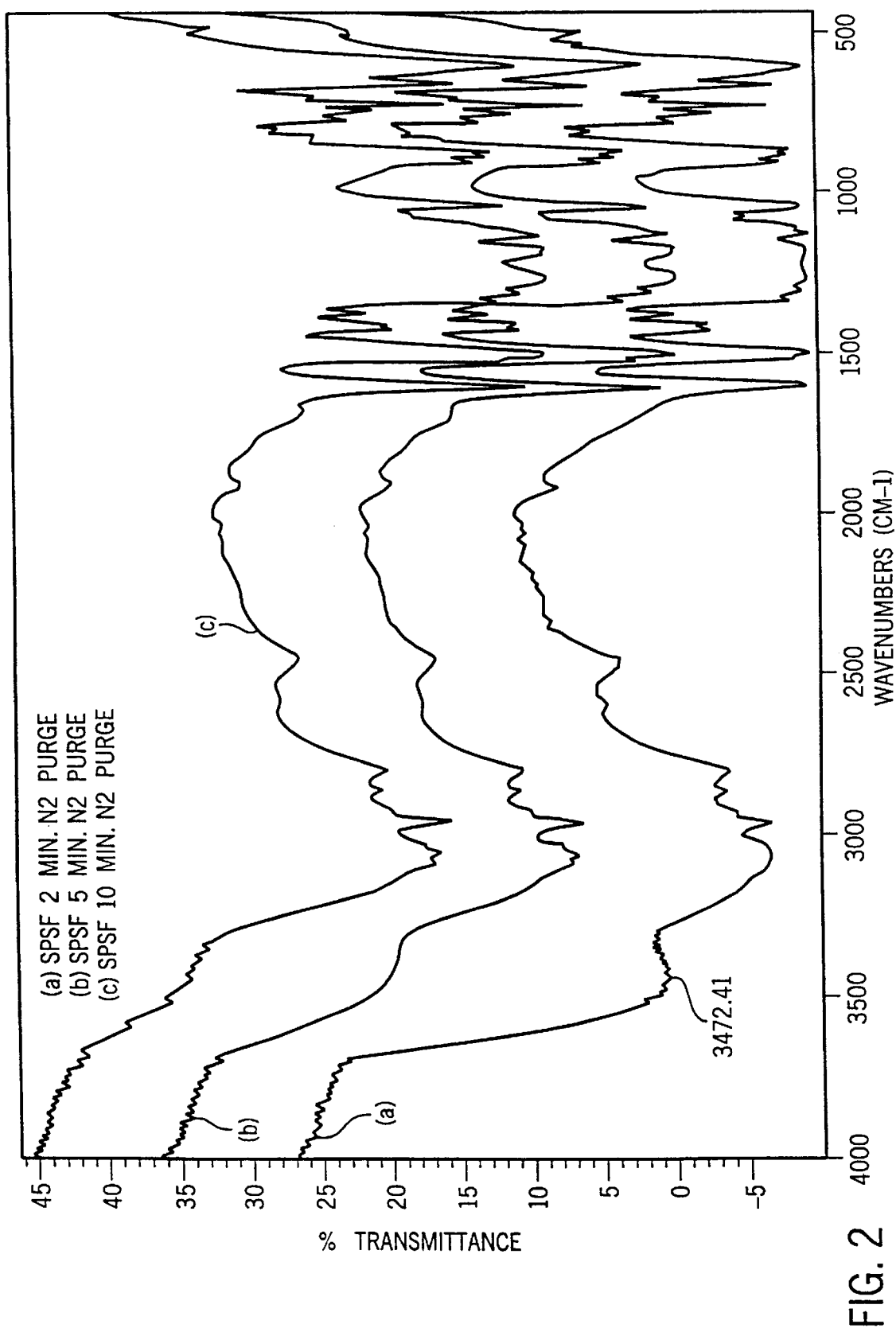

FIG. 1 shows the FTIR spectra for pure polysulfone and sulfonated PSF (—$SO_3H$ groups). Peaks within the region 2800 to 2200 $cm^{-1}$ are associated to the S—OH linkages, while the broad absorption around 3400 $cm^{-1}$ is commonly related to hydroxyl groups. While polysulfonate presents a poor moisture absorption capacity, due to its hydrophobicity, the sulfonated PSF with sulfonic acid side groups can incorporate moisture due to its inherent hydrophilicity. A simple experiment in which FTIR spectra of a sulfonated PSF were collected while the chamber was purged with dry nitrogen could enable the visualization of this behavior (FIG. 2). In this case, the broad absorption band due to the presence of adsorbed moisture is significantly reduced when the purging time is increased.

EXAMPLE 2

Sulfonated polycarbonate was obtained by dissolving a commercially available polymer (MW=50K) in chloroform (10% wt.). Chlorosulfonic acid was added to the solution at room temperature for 30 minutes (molar ratio between chlorosulfonic acid/polycarbonate repeat unit=2). The sulfonated polymer, having—$SO_2OH$— attached to the phenol rings in the Bisphenol A part of the polycarbonate repeat unit, was then isolated by adding isopropanol to the mixture.

Thin sulfonated polycarbonate films were cast from a chloroform solution and analyzed using FTIR in transmission mode.

The use of FTIR transmission spectra, NMR spectra and thermogravimetric analysis confirmed the introduction of sulfonic acid groups into the aromatic rings of the polysulfone and polycarbonate polymers.

Figure 3:
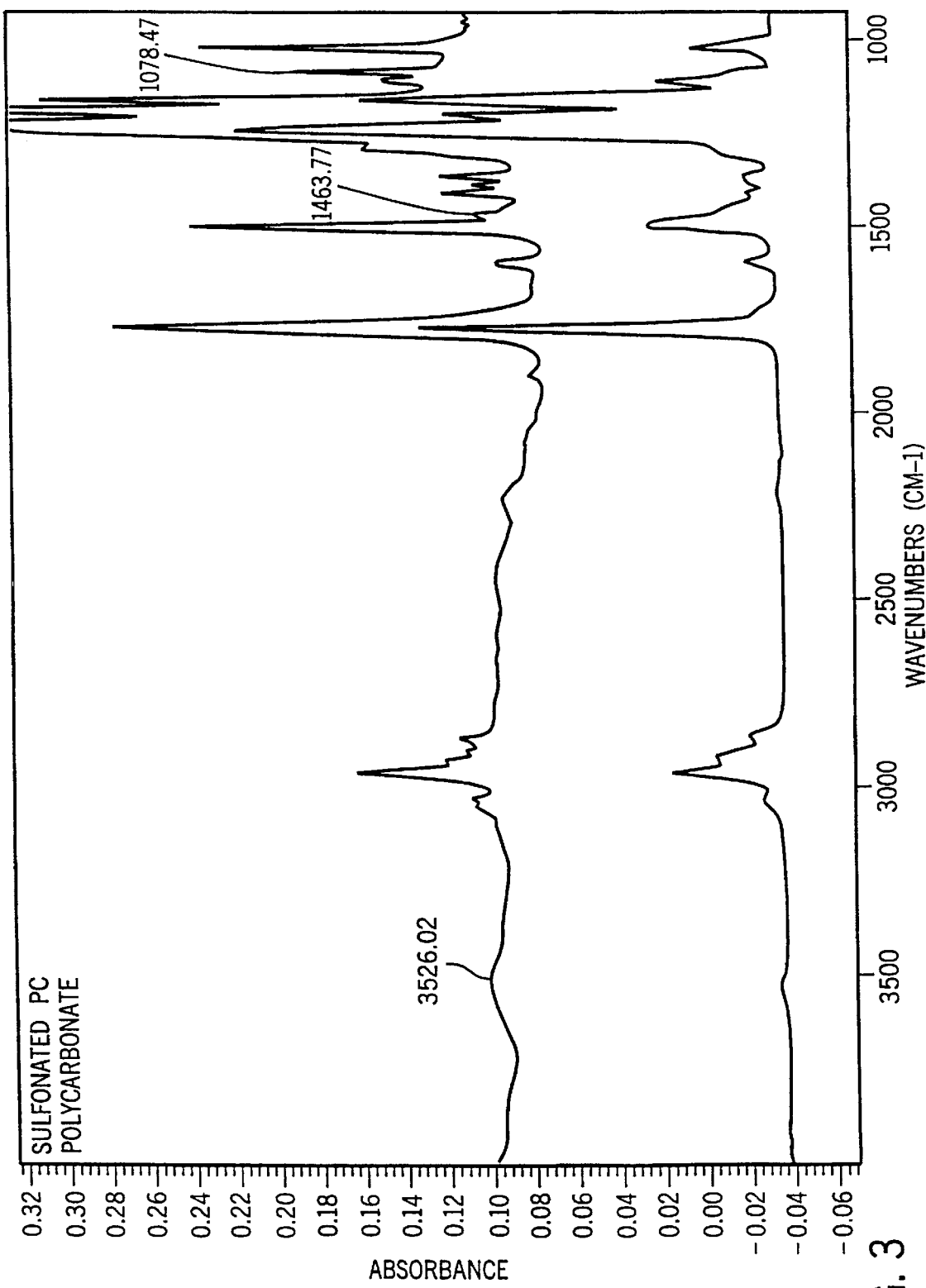

The sulfonated polycarbonate and the original polymer have their FTIR spectra shown in FIG. 3. Broad absorption bands at frequencies between 3200–3700 and 2000–2700 $cm^{-1}$ are characteristic of sulfonic acid groups. Also, the peak at 1080 $cm^{-1}$ can be attributed to S—O bonds in sulfonic acid groups. A new peak at 1463 $cm^{-1}$ is also representative of the substitution reaction, since this peak arises from the fact that the new group attached to the benzene ring changes the vibrational modes of the ring, which frequency is shown at 1500 $cm^{-1}$.

EXAMPLE 3

Sulfonated polysulfones obtained according to the method of Example 1 and having one and two sulfonic acid groups per repeat unit, respectively, were silanated as follows:

1. To a solution of sulfonated polysulfone (SPSF) in DMF (5%), aminopropyltriethyoxysilane was added. The solution was stirred for five minutes and films were cast on glass slides at 60° C. and dried overnight at 160° C. The amount of silane was also varied in order to yield materials with different degrees of silanation. Compositions with one silane group per repeat unit and one silane group every three repeat units were executed. Films having one silane group per repeat unit and two silane groups per repeat unit were prepared.

2. To a solution of sulfonated polysulfone (SPSF) in DMF (5%), glycidoxypropylmethoxysilane (GPS) was added. The solution was stirred for five minutes and water (water/silane molar ratio=3) at pH=1.5 (adjusted by using $HNO_3$) was added and films were cast on glass slides at 60° C. and dried overnight at 160° C. Films having one silane group per repeat unit and two silane groups per repeat unit were produced.

3. To a solution of sulfonated polysulfone (SPSF) in DMF (5%) glycidoxypropylmethoxysilane (GPS) was added. The solution was stirred for five minutes and TEOS followed by water (water/silane molar ratio=3) at pH=1.5 (adjusted by using $HNO_3$) were added and films were cast on glass slides at 60° C. and dried overnight at 160° C. The final composition of the solution had SPSF/silanes weight ratios equal to 1. Films having one silane group per repeat unit and two silane groups per repeat unit were produced.

The behavior of the solutions, as well as the aspect of the films, were observed visually. The inorganic concentration of the ceramers were checked using TG/DTA.

The cast films were cut and introduced in aluminum pans for DSC analysis. The DSC was conducted in an atmosphere of nitrogen at a heating ratio of 10° C. FTIR and TG analysis confirmed the composition and structure of the modified polymers.

The present invention provides silane functionalized polymers for highly abrasion-resistant coatings, bonding agents, coupling agents and the like. The polymers described will be ideally suited for use in hybrid nanophase composites with optical properties of adjustable refractive indices and high refractive indices. The described polymers can be formulated over broad composition ranges such that the polymer can be either hydrophobic or hydrophilic. The silane functionalized compound can be combined with other silanes, homopolymers or other compounds that can preferably provide water to react the silanes. These materials can be coated onto surfaces, injection molded, thermoformed, etc.

Many applications are enabled by these new hybrids. Coatings with a tailorable index of refraction can be prepared by changing the relative amount of phases. Protective coatings against wear can be proposed, since the use of high glass transition temperature polymers will lead to high mechanical properties. These materials can be used as interfacial agents in composites with tailorable properties, i.e., they can have chemical features that resemble both polymeric matrices as well as inorganic fillers or fibers.

We claim:

1. A method of preparing a silane functionalized polyaromatic polymer comprising reacting a sulfonated polyaromatic polymer having sulfonic acid groups on repeat aromatic rings therein with a silane terminated coupling agent capable of undergoing a condensation reaction with said sulfonic acid groups to produce a polyaromatic polymer having silane terminated groups on said repeat aromatic rings; said reaction being conducted under conditions which do not substantially destabilize said polyaromatic polymer.

2. The method of claim 1 including the step of providing said sulfonated polyaromatic polymer by reacting a polyaromatic polymer with a sulfonating agent to introduce sulfonic acid groups on repeat aromatic rings therein.

3. The method of claim 1 wherein said polyaromatic polymer is a polyarylsulfone, polyarylethersulfone, polyarylimide, polyarylcarbonate, polyaryloxide, polyarylether, polyaryletherketone, polyarylalkene or copolymers or mixtures thereof.

4. The method of claim 1 wherein said polyaromatic polymer is a polyarylsulfone.

5. The method of claim 4 wherein said polyarylsulfone is polyphenylene ether sulfone.

6. The method of claim 1 wherein said polyaromatic polymer is a polyarylcarbonate.

7. The method of claim 6 wherein said polyarylcarbonate is a bisphenol-A polycarbonate.

8. The method of claim 1 wherein said sulfonating agent is chlorosulfonic acid.

9. The method of claim 1 wherein said silane terminated coupling agent has the formula:

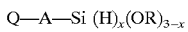

wherein:
  Q is a functional group capable of undergoing a condensation reaction with said sulfonic acid groups;
  A is a non-reactive bridging group between Q and Si;
  R is an alkyl or alkenyl group having from 1 to 4 carbon atoms; and
  x is an integer from 0 to 2.

10. The method of claim 9 wherein Q is.

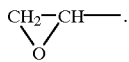

11. The method of claim 9 wherein Q is $NH_2$—.

12. The method of claim 9 wherein A is alkylene having 1 to 200 carbon atoms.

13. The method of claim 9 wherein x is 0.

14. The method of claim 9 wherein said coupling agent has the formula:

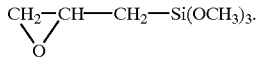

15. The method of claim 9 wherein said coupling agent has the formula:

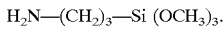

16. The method of claim 9 wherein said coupling agent has the formula:

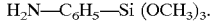

17. The method of claim 1 wherein the molar ratio of sulfonating agent to polyaromatic polymer is from about 1:1 to about 180:1.

18. The method of claim 17 wherein said ratio is from about 45:1 to about 125:1.

19. The silane functionalized polyaromatic polymer produced by the method of claim 1.

20. A silane functional polyromatic polymer having the formula:

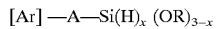

wherein:
  Ar is a great aromatic ring in said polyaromatic polymer;
  A is a non-reactive bridging group between Ar and Si;
  R is an alkyl group having from 1 to 4 carbon atoms; and
  x is an integer from 0 to 2;
wherein said polymer is a polyaryl sulfone, polyarylcarbonate, or copolymers mixtures therof.

21. The silane functionalized polyaromatic polymer of claim 20 wherein said polyaromatic polymer is a polyarylsulfone.

22. The silane functionalized polyaromatic polymer of claim 21 wherein said polyarylsulfone is polyphenylenesulfone.

23. The silane functionalized polyaromatic polymer of claim 20 wherein said polyaromatic polymer is a polyarylcarbonate.

24. The silane functionalized polyaromatic polymer of claim 22, wherein said polyarylcarbonate is a bisphenol-A polycarbonate.

25. The silane functionalized polyaromatic polymer of claim 20 wherein A is alkylene.

26. The silane functionalized polyaromatic polymer of claim 20 wherein x is 0.

* * * * *

UNITED STATES PATENT AND TRADEMARK OFFICE
CERTIFICATE OF CORRECTION

PATENT NO. : 6,380,307 B1
DATED : April 30, 2002
INVENTOR(S) : Anthony B. Brennan, Rodrigo L. Orefice and Michael P. Zamora It is certified that error appears in the above-identified patent and that said Letters Patent is hereby corrected as shown below:

<u>Title page,</u>
Item [73], Assignee: "University of Flordia" should read -- University of Florida --.

<u>Column 3,</u>
Line 46, "polyaryl-alkenes" should read -- polyarylalkenes --.

<u>Column 5,</u>
Line 3, "$cm^{-1}$are" should read -- $cm^{-1}$ are --.
Line 4, "$cm^{-1}$is" should read -- $cm^{-1}$ is --.
Line 36, "$cm^{-1}$are" should read -- $cm^{-1}$ can --.
Line 37, "$cm^{-1}$can" should read -- $cm^{-1}$ can --.

<u>Column 8,</u>
Line 8, "polyromatic" should read -- polyaromatic --.
Line 13, "great aromatic" should read -- repeat aromatic --.
Line 15, "an alkyl group" should read -- an alkyl or alkenyl group --.
Line 18, "said polymer" should read -- said polyaromatic polymer --.

Signed and Sealed this

Twenty-ninth Day of October, 2002

*Attest:*

JAMES E. ROGAN
*Attesting Officer*    *Director of the United States Patent and Trademark Office*